(12) United States Patent
Iwaki (10) Patent No.: US 6,771,747 B2
(45) Date of Patent: Aug. 3, 2004

(54) METHOD OF CALLING UP TARGET CALL RECEIVER AND COMMUNICATIONS TERMINAL EQUIPMENT USED FOR IMPLEMENTING SAME

(75) Inventor: Takeshi Iwaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/107,165

(22) Filed: Mar. 28, 2002

(65) Prior Publication Data

US 2003/0103622 A1 Jun. 5, 2003

(30) Foreign Application Priority Data

Nov. 29, 2001 (JP) ...................................... 2001-363670

(51) Int. Cl.[7] .............................................. H04M 1/64
(52) U.S. Cl. .............................. 379/88.16; 379/373.02; 379/374.02
(58) Field of Search ........................ 379/373.01–376.02, 379/88.16, 88.19, 88.22, 88.23

(56) References Cited

U.S. PATENT DOCUMENTS

| | | | | |
|---|---|---|---|---|
| 5,598,461 A | * | 1/1997 | Greenberg ................ | 379/88.24 |
| 5,649,007 A | * | 7/1997 | Yamada ................... | 379/375.01 |
| 5,724,411 A | * | 3/1998 | Eisdorfer et al. ......... | 379/93.23 |
| 5,745,562 A | * | 4/1998 | Penning .................. | 379/215.01 |
| 5,802,148 A | * | 9/1998 | Sizer, II .................. | 379/88.19 |
| 5,850,435 A | * | 12/1998 | Devillier ................. | 379/374.02 |
| 5,991,397 A | * | 11/1999 | Han ....................... | 379/373.04 |
| 6,226,379 B1 | * | 5/2001 | Swan et al. ............. | 379/373.02 |

FOREIGN PATENT DOCUMENTS

| | | |
|---|---|---|
| JP | 11008703 | 1/1999 |
| JP | 2000209346 | 7/2000 |
| JP | 2001103159 | 4/2001 |

* cited by examiner

Primary Examiner—Roland G. Foster
(74) Attorney, Agent, or Firm—Rabin & Berdo, P.C.

(57) ABSTRACT

A communications terminal equipment according to the invention is a communications terminal equipment connected to a single communication circuit for use by a plurality of users, comprising an extension number database which is a first database, provided in a memory, a processor, and a speech output unit. Respective names of cataloged users of the communications terminal equipment and numbers corresponding to the respective names of the cataloged users are stored (cataloged) in the extension number database as cataloged extension numbers. The processor receives a designated cataloged extension number, as designated and inputted by a caller, and identify the name of a target call receiver by referring the designated cataloged extension number to the cataloged extension numbers in the extension number database. Subsequently, on the basis of the name of the target call receiver, and a predetermined call-up message, the processor generates a call-up speech for the target call receiver, whereupon the speech output unit outputs the call-up speech.

8 Claims, 8 Drawing Sheets

100: communication terminal equipment 110: memory

BLOCK DIAGRAM OF A COMMUNICATIONS TERMINAL
EQUIPMENT ACCORDING TO FIRST EMBODIMENT OF THE INVENTION

FIG. 1

100: communication terminal equipment  110: memory

BLOCK DIAGRAM OF A COMMUNICATIONS TERMINAL
EQUIPMENT ACCORDING TO FIRST EMBODIMENT OF THE INVENTION

FIG. 2

RESPECTIVE COMPONENTS INSIDE THE PROCESSOR

FIG. 3

FLOW CHART SHOWING PROCESSING
ACCORDING TO FIRST EMBODIMENT OF THE INVENTION

FIG. 4

200: communication terminal equipment

BLOCK DIAGRAM OF A COMMUNICATIONS TERMINAL
EQUIPMENT ACCORDING TO SECOND EMBODIMENT OF THE INVENTION

FIG. 5

FLOW CHART SHOWING PARTS OF PROCESSING
ACCORDING TO SECOND EMBODIMENT OF THE INVENTION

FIG. 6

400: communication terminal equipment

BLOCK DIAGRAM OF A COMMUNICATIONS TERMINAL
EQUIPMENT ACCORDING TO FOURTH EMBODIMENT OF THE INVENTION

FIG. 7

FLOW CHART SHOWING PARTS OF PROCESSING
ACCORDING TO FOURTH EMBODIMENT OF THE INVENTION

FIG. 8

FLOW CHART SHOWING PARTS OF PROCESSING
ACCORDING TO A VARIATION TO FOURTH EMBODIMENT OF THE INVENTION

METHOD OF CALLING UP TARGET CALL RECEIVER AND COMMUNICATIONS TERMINAL EQUIPMENT USED FOR IMPLEMENTING SAME

BACKGROUND OF THE INVENTION

1. Field of the Invention

The invention relates to a communications terminal equipment wherein a single dedicated line is utilized by a plurality of users, and a method of calling up a target call receiver by use of the same.

2. Description of the Related Art

In the case of a plurality of users making use of a single dedicated line, it has been a conventional practice for a transmitting party (referred to hereinafter as a caller) to put in a call to a communications terminal equipment such as telephone, and so forth, thereby causing a calling sound to be outputted to a telephone at the receiving end, whereupon an unspecified user among the plurality of users receives the call.

In this case, however, a party whom the caller intends to call up will not necessarily receive the call, in which case, the unspecified user receiving the call has to relay the call to one of the users whom the caller intends to call up (hereinafter referred to as a target call receiver). In such a case, if, for example, each of the users is busy, the unspecified user relaying the call has had to bear the burden of loss in time.

There has also been adopted a practice such that each of the users is provided with a communications terminal equipment for exclusive use in the extension line, and a specified person is charged with taking care of calls from the outside line, thereby relaying respective calls to the communications terminal equipment for exclusive use in the extension line, assigned to the respective users. This practice, however, has caused a problem of an increase in cost due to personal expenses involved in employment of the specified person charged with taking care of calls from the outside line, and an increase in the number of the communications terminal equipment for exclusive use in the extension line.

SUMMARY OF THE INVENTION

It is therefore an object of the invention to provide a simple and convenient method of calling up a target call receiver, and a communications terminal equipment with which said method can be implemented.

To this end, a communications terminal equipment according to the invention is a communications terminal equipment connected to a single communication circuit for use by a plurality of users, comprising an extension number database which is a first database, provided in a memory, a processor, and a speech output unit. Respective names of cataloged users of the communications terminal equipment and numbers corresponding to the respective names of the cataloged users are stored (cataloged) in the extension number database as respective cataloged extension numbers. The processor receives a designated cataloged extension number, as designated and inputted by a caller, and identify the name of a target call receiver by referring the designated cataloged extension number to the cataloged extension numbers in the extension number database. Subsequently, on the basis of the name of the target call receiver, and a predetermined call-up message, the processor generates a call-up speech for the target call receiver, whereupon the speech output unit outputs the call-up speech.

With such a configuration as described above, the communications terminal equipment can outputs a speech saying, for example, "There's a call for Mr. (Ms.) . . . ", so that time involved in relaying a telephone call can be saved.

DESCRIPTION OF THE PREFERRED EMBODIMENTS

First Embodiment

Figure 1:
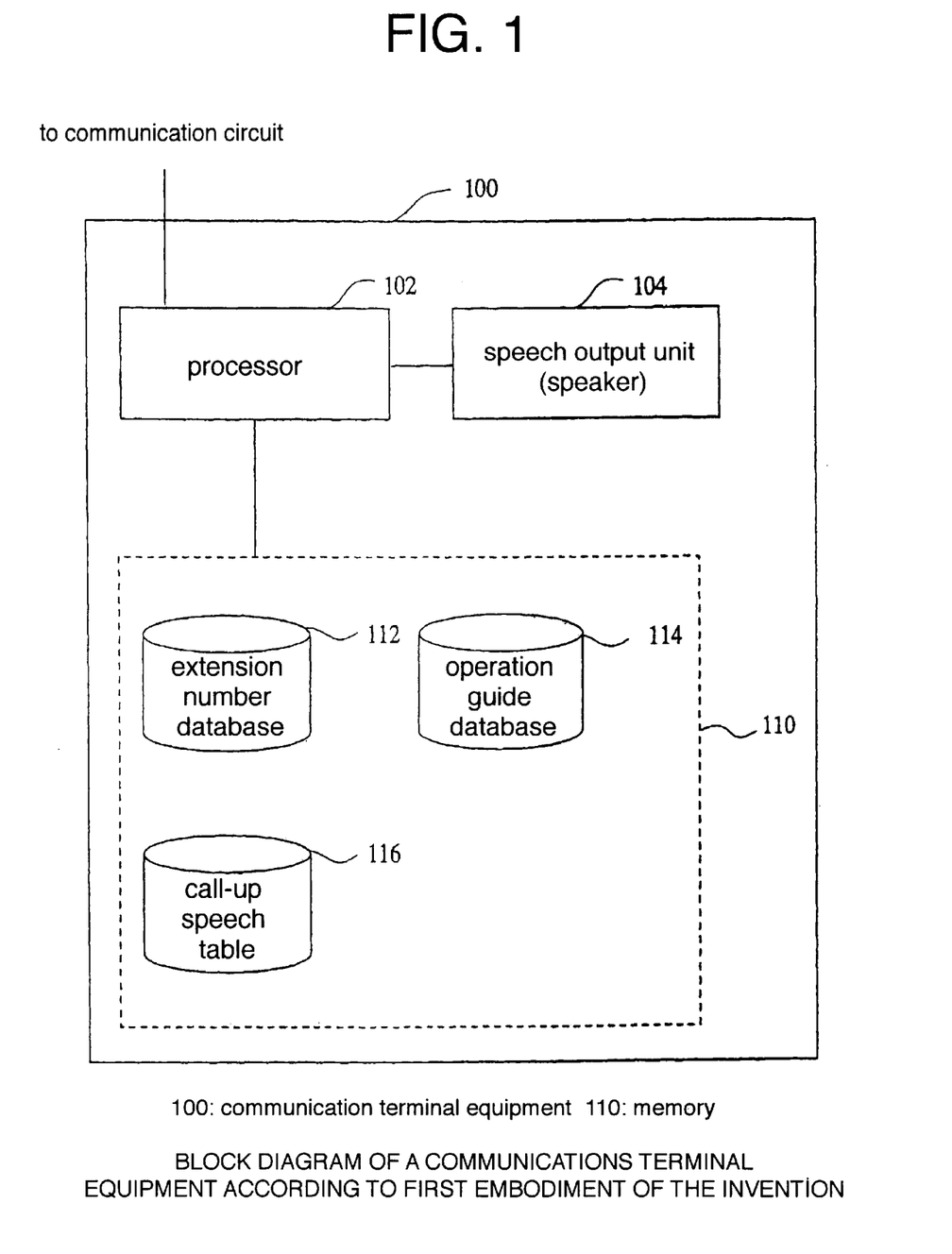
FIG. 1 is a block diagram of a first embodiment of a communications terminal equipment according to the invention.

A first embodiment of a communications terminal equipment according to the invention is described hereinafter with reference to FIGS. 1 to 3. FIG. 1 is a block diagram showing the first embodiment of the communications terminal equipment according to the invention. The communications terminal equipment 100 is connected to a communication circuit, and incorporates a processor 102, a memory 110, and a speech output unit 104. Further, the communications terminal equipment 100 comprises an input unit and a display although not shown in the figures.

The processor 102 performs transmit/receive of information over the communication circuit, and gains access to the memory 110 to read and write respective data, thereby performing various processing of the data (details will be described later).

Figure 2:
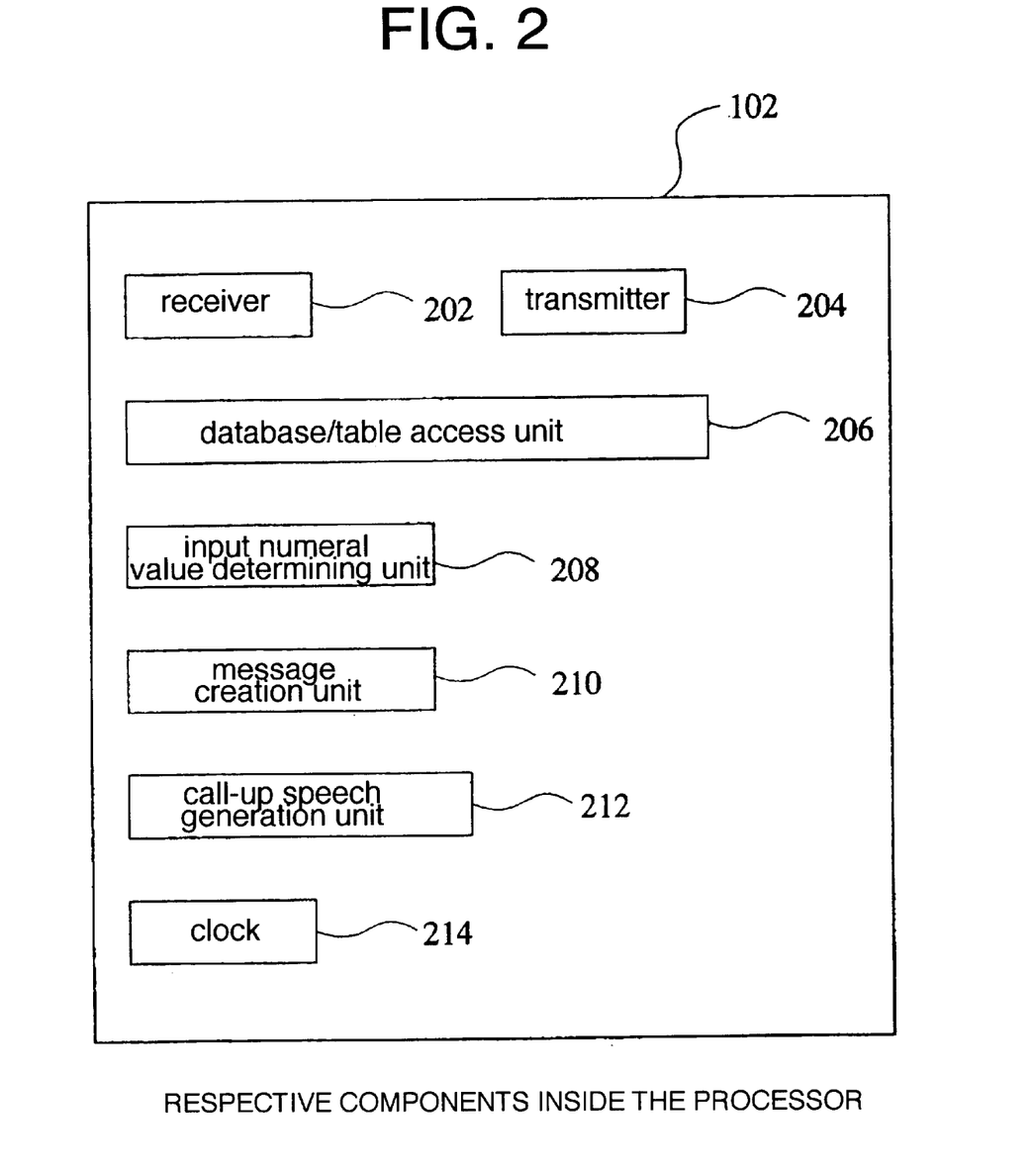
FIG. 2 is a block diagram showing respective components inside a processor of the communications terminal equipment according to the first embodiment of the invention.

FIG. 2 is a block diagram showing the interior of the processor 102 by way of example. A receiver 202 receives information via the communication circuit, and a transmitter 204 sends out (transmits) information via the communication circuit. A database/table access unit 206 gains access to various databases or a table to mainly read out data. An input numeral value determining unit 208 is a step of a processing flow, and determines numerical values inputted by a caller via a communications terminal equipment (not shown) at the sending end, thereby making a decision about a next processing step. A message creation unit 210 creates operation guide and messages for the caller. A call-up speech generation unit 212 generates call-up speech (speech data), and transmits the same to the speech output unit 104. A clock 214 sends out time necessary for processing.

The memory 110 incorporates an extension number database 112 which is a first database, an operation guide database 114 which is a second database, and a call-up speech table 116. The extension number database 112 is a database wherein numbers corresponding to names of a plurality of users (names of cataloged users), respectively, are stored as cataloged extension numbers (details will be described later). The operation guide database 114 is a database wherein various messages for providing the caller with guides for input operation are stored in the form of speech data. Speech data necessary for generating call-up speech except for the name of a target call receiver are stored in the call-up speech table 116.

It is to be pointed out in this connection that the respective databases and the table are differentiated by the function, and designated differently, however, these can be configured on the same memory set (for example, a nonvolatile semiconductor memory). It is also possible to install the call-up speech table 116 inside the operation guide database 114 instead of installing the same independently because the speech data stored in the call-up speech table 116 are relatively short.

The speech output unit 104 is made up of a speaker and so forth.

Table 1 shows an example of data stored in the extension number database 112 according to the first embodiment of the invention. For example, speech data for the name of a user called "Aikawa" are cataloged against a cataloged extension number 1. The speech data are cataloged beforehand, and such cataloging can be performed by the same method as a method of recording sound in a voice recorder. As a result, the speech data are cataloged as a recorded sound message.

In the case of the example shown in Table 1, the names of users corresponding to cataloged extension numbers 1 to 4, respectively, are cataloged as respective speech data. A cataloged extension number 0 corresponds to the sound of a bell as a case of default, however, the sound of the bell does not necessarily need to be cataloged.

Table 1

Figure 3:
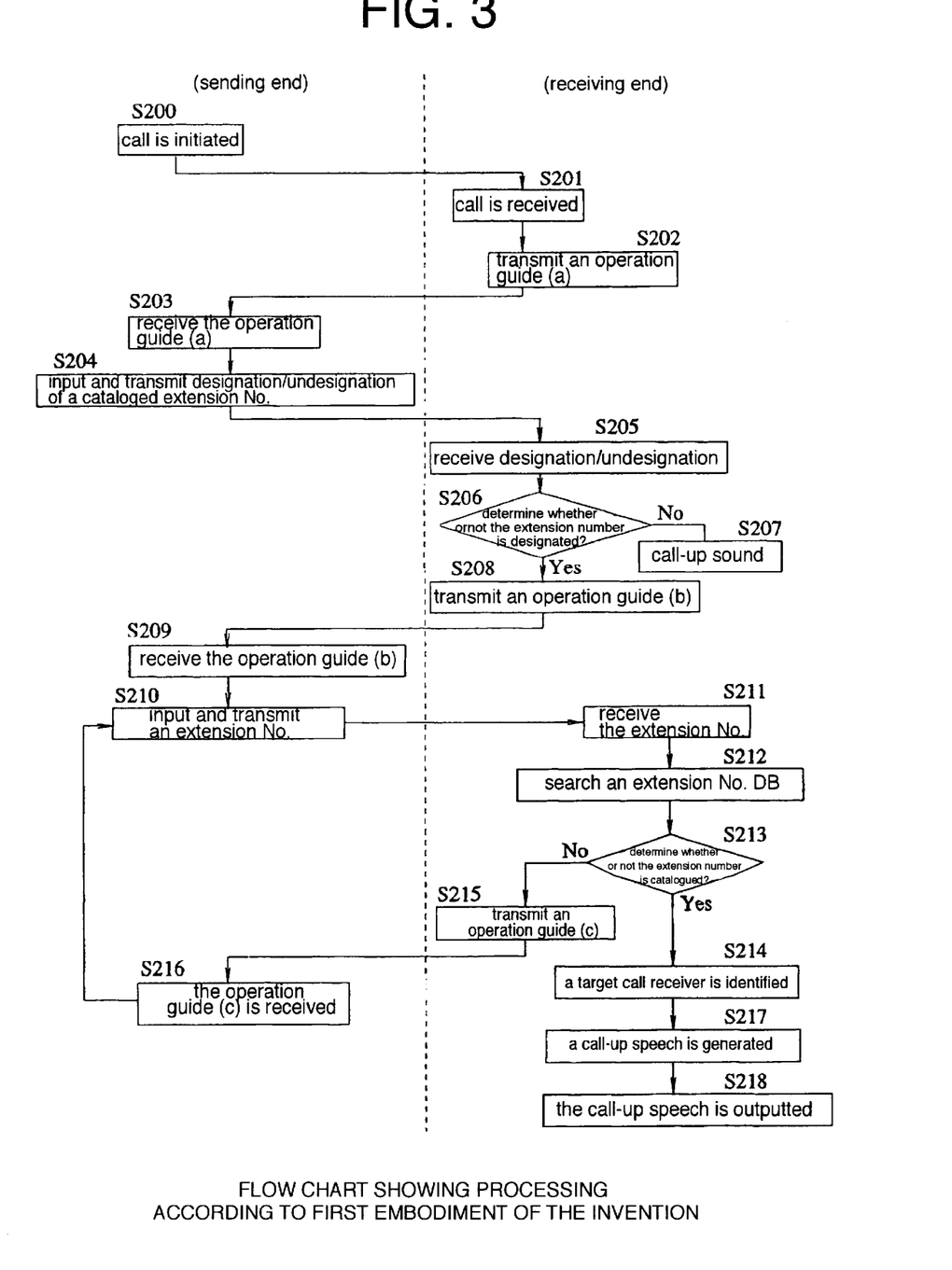
FIG. 3 is flow chart showing the process of outputting a call-up speech according to the first embodiment of the invention.

FIG. 3 is flow chart showing the process of outputting a call-up speech according to the first embodiment of the invention.

A caller puts in a call towards the communications terminal equipment 100 at the receiving end (makes a telephone call) (step: S200). The communications terminal equipment 100 at the receiving end receives the call (step: S201). A common type telephone keeps sounding a bell. In contrast, in response to the call, the processor 102 of the communications terminal equipment 100 according to the first embodiment of the invention gains access to the operation guide database 114, and reads an operation guide (a) shown in Table 2 by way of example, thereby transmitting the same to the caller (step: S202). The communications terminal equipment at the sending end receives the operation guide (a), which is conveyed to the caller as speech data or shown in the display at the sending end (step: S203).

Table 2

Following the message of the operation guide (a), the caller inputs designation/undesignation of a cataloged extension number via the input unit, and transmits the same as a response signal (in this example, the number 1 (expressing designation) or the number 0 (expressing undesignation) is pressed) (step: S204). The communications terminal equipment 100 at the receiving end receives the response signal (step: S205). The processor 102 determines whether the response signal means designation or undesignation (step: S206). In the case of the response signal indicating undesignation (the number 0), the processor 102 produce a normal calling sound (step: S207). On the other hand, in the case of the response signal indicating designation (the number 1), the processor 102 gains access to the operation guide database 114, and reads an operation guide (b) shown in Table 2 by way of example, thereby transmitting the same to the caller (step: S208). In this connection, the numbers and the names of users, given inside the parentheses, within the operation guide (b), do not exist at the outset, and are created by the message creation unit 210 of the processor 102 by making use of data stored in the extension number database 112 (the same applies to messages described hereinafter).

The communications terminal equipment at the sending end receives the operation guide (b) (step: S209). Following the operation guide (b), the caller inputs a designated extension number, corresponding to the name of a terminal user whom the caller wants to call up, that is, the name of a target call receiver, and transmits the same as call-up information (step: S210).

The communications terminal equipment 100 at the receiving end receives the call-up information (step: S211). In response to the call-up information, the processor 102 searches the extension number database 112 (step: S212), and determines whether or not the designated extension number as received is cataloged (step: S213). Upon determining that the designated extension number as received is not cataloged, the processor 102 gains access to the operation guide database 114, and reads an operation guide (c) shown in Table 2 by way of example, thereby transmitting the same to the caller (step: S215). The communications terminal equipment at the sending end receives the operation guide (c) (step: S216). Following the message of the operation guide (c), the caller re-inputs an extension number (step: S210). On the other hand, upon determining that the designated extension number as received is cataloged, the processor 102 identify the name of the target call receiver (speech data) (for example, "Inoue" if a cataloged extension number is "2") (step: S214), and further, makes use of speech data (for example, "There's a call for Mr. (Ms.) . . . ") in the call-up speech table 116, thereby generating a call-up speech (step: S217). Subsequently, the speech output unit 104 outputs the call-up speech (in the case of the example described above, "There's a call for Mr. (Ms.) Inoue" (step: S218).

With the first embodiment of the communications terminal equipment according to the invention, since the name of the target call receiver is outputted in the form of the call-up speech from the communications terminal equipment 100, troublesomeness involved in relaying the call can be reduced. Further, rewriting the contents of the memory 110 of the communications terminal equipment 100 will suffice for setting and changing of the names of the plurality of the users and the extension numbers, so that there will be no need for a large-scale change in a communication system. Furthermore, a general-purpose communications terminal equipment without any special modification will suffice for the communications terminal equipment at the sending end.

Second Embodiment

Figure 4:
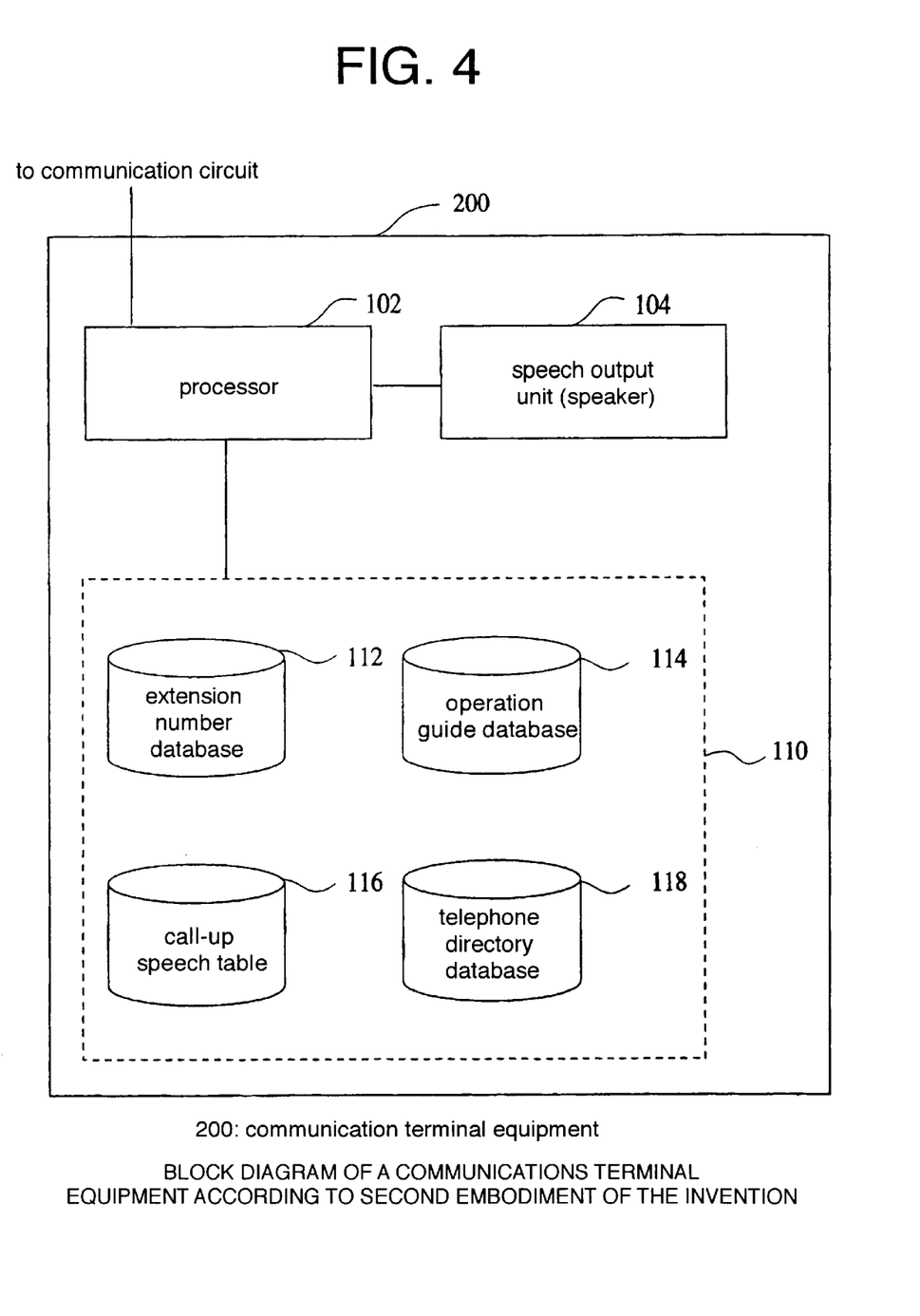
FIG. 4 is a block diagram of a communications terminal equipment according to a second embodiment of the invention.
Figure 5:
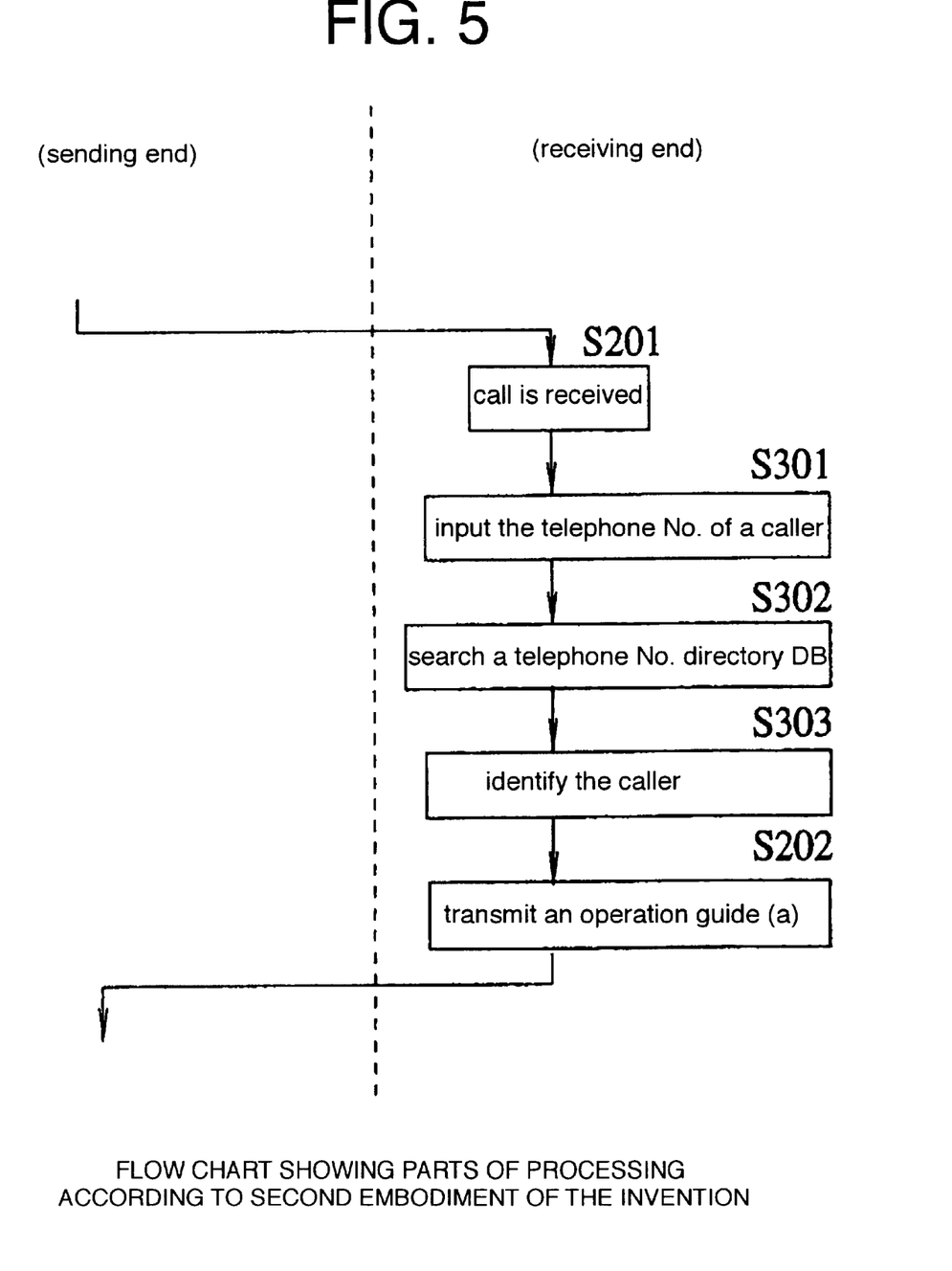
FIG. 5 is flow chart showing the process of outputting a call-up speech according to the second embodiment of the invention.

A second embodiment of a communications terminal equipment according to the invention is described hereinafter with reference to FIGS. 4 and 5. FIG. 4 is a block diagram of the communications terminal equipment 200 according to the second embodiment of the invention, additionally incorporating a telephone directory database 118 which is a third database in comparison with the communications terminal equipment 100 according to the first embodiment.

Table 3 shows an example of data stored in the telephone directory database 118. For example, speech data for the name of a caller using a terminal at the sending end, called "Ando", are cataloged against a telephone number 03-1234-5678. The name of the caller is not limited to the name of an individual, but may be the name of a corporation (for example, A Co., Ltd.). The speech data are cataloged beforehand, and such cataloging can be performed by, for example, the same method as a method of recording the name of a caller in a voice recorder after inputting a telephone number. As a result, the speech data are cataloged as a recorded sound message.

Table 3

With the second embodiment of the communications terminal equipment according to the invention, it is possible to output a speech conveying the name of the caller as well, such as a call-up speech saying "There's a call from Mr. xx for Mr. (Ms.) . . . " (xx is the name of the caller). FIG. 5 is a flow chart showing the process of outputting a call-up speech according to the second embodiment of the invention.

In the figure, parts corresponding to those for the first embodiment are omitted for simplification of description. The process up to the step (S201) of the communications terminal equipment 200 at the receiving end receiving a call is the same as that for the first embodiment. With the second embodiment of the invention, a processor 102 subsequently receives (inputs) the telephone number of a caller as input information (S301). In response to the input information, the processor 102 gains access to the telephone directory database 118, and searches the same (S302), thereby identifying the caller cataloged against the telephone number (S303). Subsequent steps of the process are the same as those for the first embodiment.

With the second embodiment, however, the processor 102 makes use of the caller as identified and different speech data (for example, "for Mr. . . . ", and "There's a call from Mr. xx) stored in the call-up speech table 116, thereby generating a call-up speech in the step (S217) of generating the call-up speech. Subsequently, a speech output unit 104 outputs the call-up speech (for example, "There's a call from Mr. Ando for Mr. (Ms.) Inoue" (S218).

Thus, with the second embodiment of the invention, not only the name of the target call receiver but also the name of the caller can be outputted as the call-up speech, so that the target call receiver can be provided with more detailed information. Furthermore, rewriting the contents of the telephone directory database 118 will suffice for setting and changing of the telephone directory database, and making an addition thereto, so that there will be no need for a large-scale change in a communication system.

Third Embodiment

A third embodiment of a communications terminal equipment according to the invention is described hereinafter with reference to Table 4.

Table 4

With the first embodiment of the invention, the names of the users are cataloged in the extension number database 112 as the speech data as shown in Table 1. With the third embodiment of the communications terminal equipment according to the invention, however, reading (that is, character information) and an accent type (that is, numbers) of the name of respective users are cataloged in an extension number database 112 as data instead of the speech data. Table 4 shows an example of the data stored in the extension number database 112 according to the third embodiment of the invention. For example, reading of "Aikawa" and an accent type "1" are cataloged against a cataloged extension number 1. In the field of Japanese Text-to-Speech, techniques for converting data based on the reading and the accent type of a name into speech data through speech synthesis are the known techniques, and a processor 102 is capable of implementing such speech synthesis.

A flow chart showing the process of outputting a call-up speech according to the third embodiment of the invention is the same as that for the first embodiment of the invention except that a processor 102 converts data based on the reading and the accent type of the name of a target call receiver corresponding to a relevant cataloged extension number into the name of a target call receiver (speech data) through speech synthesis, thereafter identifying the name of the target call receiver in the step S214.

A communications terminal equipment capable of inputting characters with keys is becoming popular. With the first embodiment of the invention, it has taken time to input the names of users by actually speaking aloud when creating the extension number database 112, however, with the third embodiment of the invention, the extension number database 112 can be created only by inputting characters and numbers with keys.

Further, as a variation to the third embodiment of the invention, the names of callers in the telephone directory database 118 as described in the second embodiment of the invention can be cataloged in the form of data based on the reading and accent type of the respective names.

It is also possible to catalog data based on the reading and accent type of the respective names in place of speech data stored in both the extension number database 112 and the telephone directory database 118.

Fourth Embodiment

Figure 6:
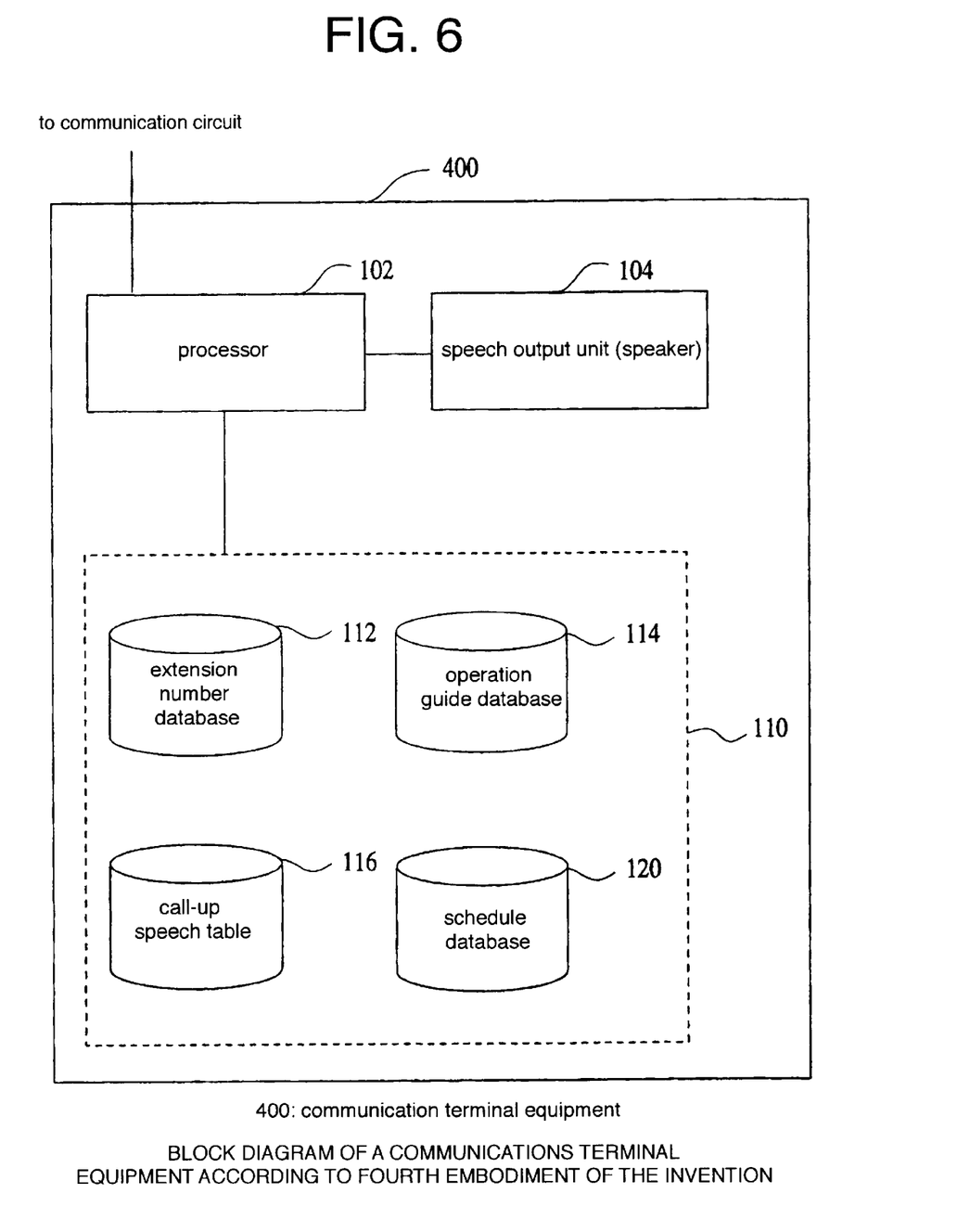
FIG. 6 a block diagram of a communications terminal equipment according to a fourth embodiment of the invention.

A fourth embodiment of a communications terminal equipment according to the invention is described hereinafter with reference to FIGS. 6 and 7. FIG. 6 is a block diagram of the communications terminal equipment 400 according to the fourth embodiment of the invention, incorporating a schedule database 120 as a fourth database, added to the communications terminal equipment 100 according to the first embodiment. The table 5 shows an example of data stored in schedule database 120. The schedule database 120 is created beforehand for every cataloged user of the communications terminal equipment 400, containing desk-leaving time and expected time to return as cataloged on every unavailable date. Such creation can be executed by a person charged with the creation of the schedule database 120 by, for example, a method of inputting the foregoing to the communications terminal equipment 400 with keys (for example, data shown in Table 5 is related to "Aikawa").

Table 5

Figure 7:
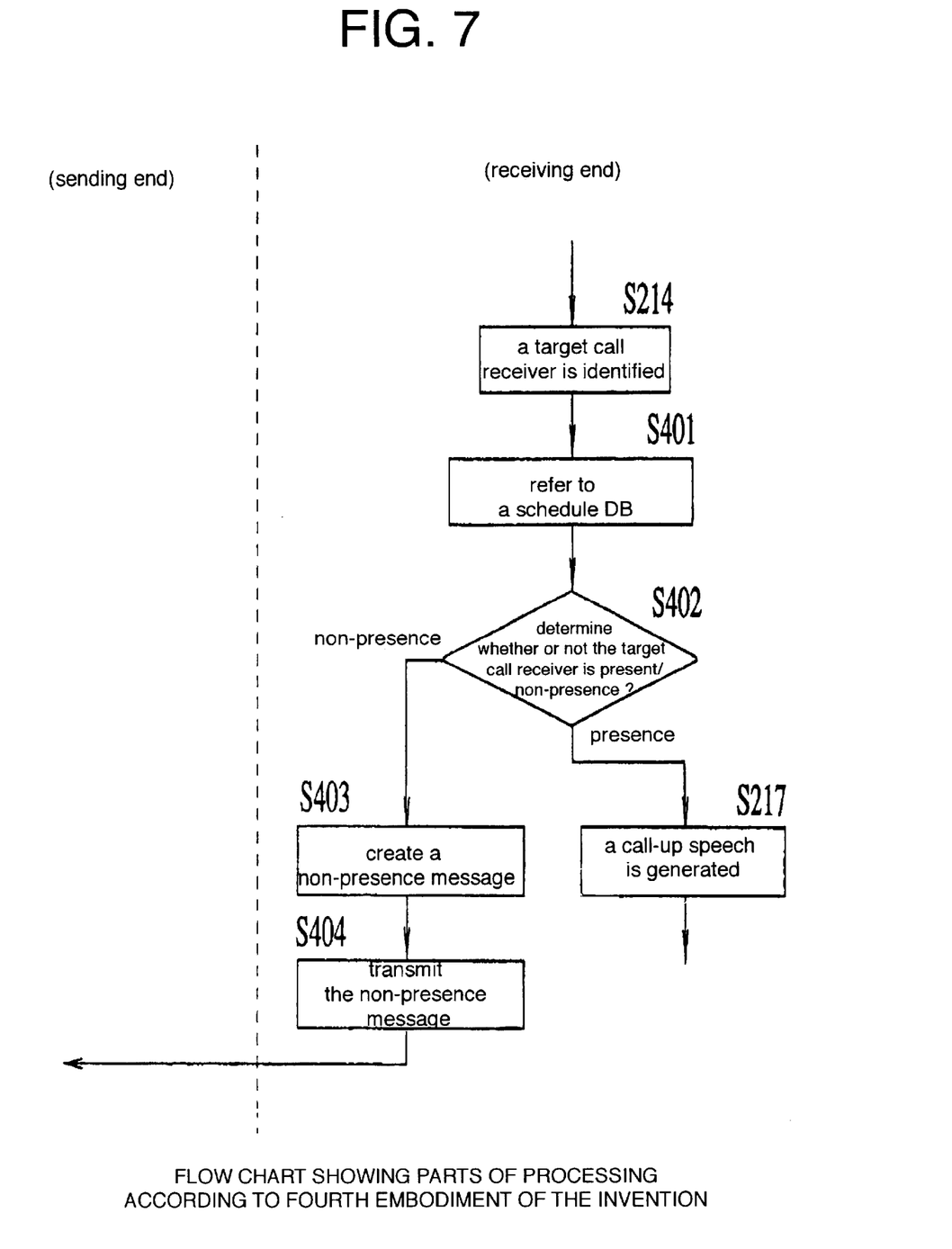
FIG. 7 is flow chart showing part of the process of outputting a call-up speech according to the fourth embodiment of the invention.

FIG. 7 is a flow chart showing the process of outputting a call-up speech according to the fourth embodiment of the invention. In the figure, parts corresponding to those for the first embodiment are omitted for simplification of description. The process up to a step S214 wherein a processor 102 of the communications terminal equipment at the receiving end identifies the name of a target call receiver is the same as that for the first embodiment. Upon identification of the name of the target call receiver (for example, "Aikawa"), the processor 102 gains access to the schedule database 120 for the target call receiver. Since a clock 214 is incorporated in the communications terminal equipment 400, the processor 102 refers present time to the schedule database 120 (step: S401). From results of such reference, the processor 102 determines whether or not the target call receiver is present (step: S402). In case (of presence) that the processor 102 determines that the target call receiver is present, the processor 102 generates a call-up speech (step: S217) as with the case of the first embodiment or the third embodiment. On the other hand, in case (of non-presence) that the processor 102 determines that the target call receiver is not present, the processor 102 creates a non-presence message (step: S403).

The non-presence message is created by the processor 102 making use of the target call receiver, desk-leaving time, expected time to return, and non-presence message data. The non-presence message data are preferably stored in an operation guide database 114. An operation guide (d) in Table 2 shows the non-presence message data by way of example. In the case of expected time to return being cataloged, there is created the non-presence message data saying "(Aikawa) is not at the desk. Expected time to return is 15:00". As previously described, what is inside the parentheses indicates the name of the target call receiver. In the case of data showing that expected time to return indicates no return, use is made of the non-presence message data shown in, for example, an operation guide (e) in Table 2, thereby creating the non-presence message saying, for example, "(Aikawa) is out of the office, and not expected to return today". Subsequently, the processor 102 transmits the non-presence message as created to a caller (step: S404). Following the non-presence message as received, the caller can take a step such as placing a call at another time, and so forth.

With the fourth embodiment of the communications terminal equipment according to the invention, the caller is able to know the schedule of the target call receiver even when out of the office, so that convenience afforded to the caller is enhanced.

Variation to the Fourth Embodiment

With the fourth embodiment of the invention, only the schedule of the target call receiver is conveyed to the caller, however, it is also possible to provide the target call receiver with service such as leaving a message, and so forth.

A communications terminal equipment according to a variation to the fourth embodiment of the invention is the same in configuration as the communications terminal equipment 400 shown in FIG. 6.

Table 6 shows an example of data stored in an extension number database 112. The data includes an e-mail address of respective users in addition to cataloged extension numbers, and the reading and accent type of the names of the respective users.

Table 6

Table 7 shows an example of data of a schedule database 120 according to the variation to the fourth embodiment of the invention. Locations of a target call receiver, and speech (conversion phrase) used in case of non-presence, on the basis of each of the locations, are cataloged in the schedule database 120.

Table 7

Figure 8:
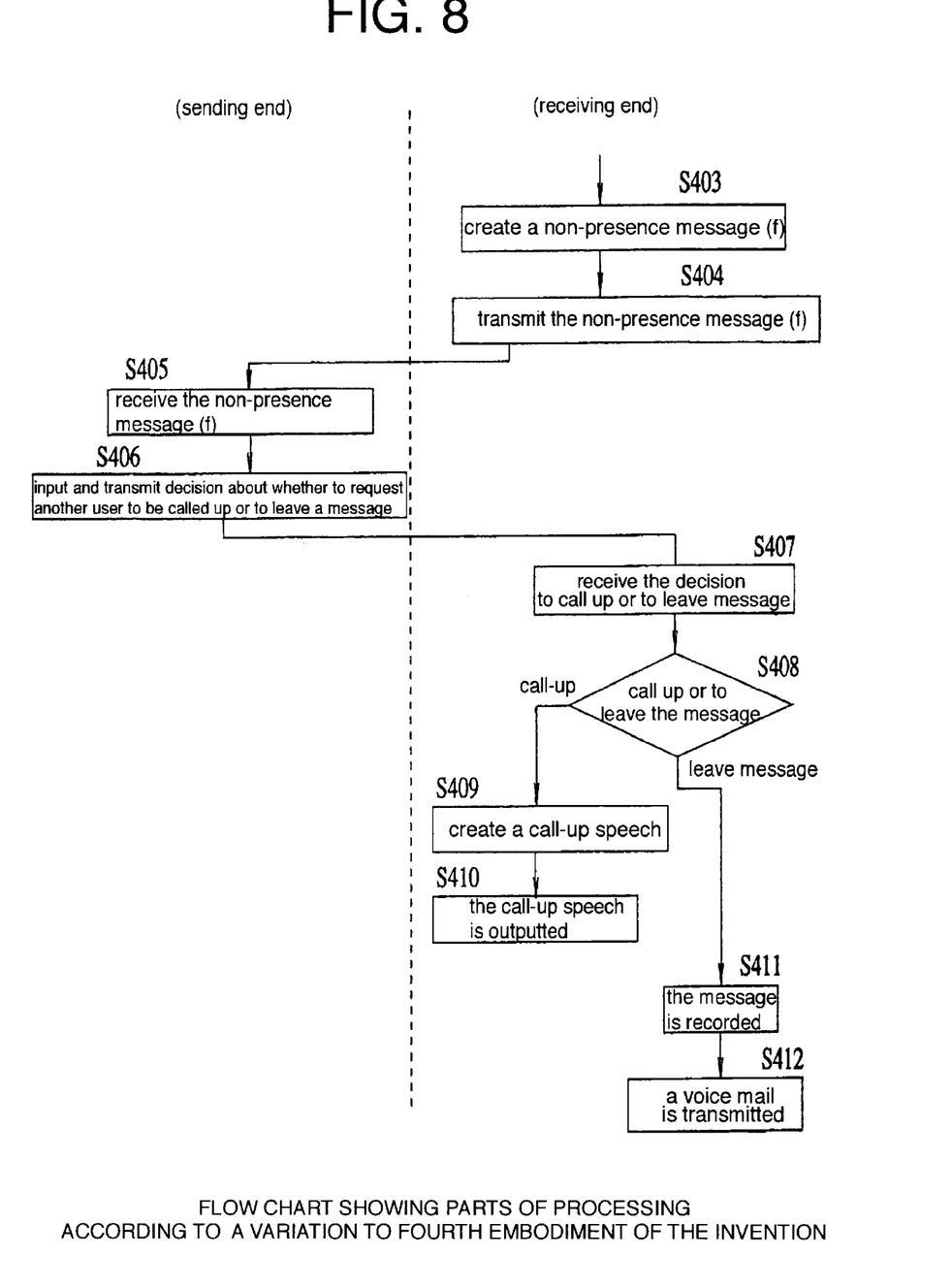
FIG. 8 is flow chart showing part of the process of outputting a call-up speech according to a variation to the fourth embodiment of the invention.

FIG. 8 is a flow chart showing the process of outputting a call-up speech according to the variation to the fourth embodiment of the invention. With the variation as well, a processor 102 creates a non-presence message (step: S403) as with the case of the fourth embodiment, however, the contents of the non-presence message contain the conversion phrase and an operation guide for service which is subsequently provided. The processor 102 creates the non-presence message by making use of non-presence message data shown in, for example, an operation guide (f) in Table 2. A communications terminal equipment 400 at the receiving end transmits a non-presence message (f) (step: S404). A communications terminal equipment at the sending end receives the non-presence message (f) (step: S405). Following the non-presence message (f), a caller makes a decision over whether to request another user of a communications terminal to answer a call (to be called up) or to have a call recorded as a voice mail (to leave a message), and input a number corresponding to the decision made as a response signal, thereby transmitting the same (step: S406).

The communications terminal equipment 400 at the receiving end receives the response signal (step: S407). The processor 102 inside the communications terminal equipment 400 at the receiving end determines whether the response signal is a signal requesting for call-up or a signal requesting for leaving a message (step: S408). In the case where it is determined that the response signal is the signal requesting for call-up, the processor 102 makes use of the name of a target call receiver as already identified, and another call-up speech of a call-up speech table 116, besides the foregoing, saying, for example, "There's a call for Mr. (Ms.) . . . As he (she) is out of the office, anyone please answer the phone", thereby creating a call-up speech (step: S409), whereupon a speech output unit 104 outputs the call-up speech as created (saying, for example, "There's a call for Mr. (Ms.) Aikawa. As he (she) is out of the office, anyone please answer the phone") (step: S410).

Meanwhile, in the case where it is determined that the response signal is the signal requesting for leaving a message, the processor 102 starts recording the message, and temporarily store the message in part of a memory 110 (step: S411). Subsequently, the processor 102 transmits the message stored in the form of an attached file as a voice mail to the e-mail address of the target call receiver, cataloged in an extension number database 112 (step: S412).

As with the second embodiment of the invention, it is also possible to identify the name of the caller, and to include the name of the caller in the call-up speech in the step S409 of creating the call-up speech.

With the abovementioned configuration of the variation, the caller is able to request users of the communications terminal, other than the target call receiver, for cooperation in dealing with the call or to be able to communicate with the target call receiver through the voice mail, so that troublesomeness of putting in a call repeatedly while the target call receiver is out of the office.

As described hereinbefore, with a communications terminal equipment wherein a single dedicated line is used by a plurality of users, the invention provides a simple and convenient method of calling up a target call receiver, and a communications terminal equipment with which said method can be implemented.

The communications terminal equipment contains the names of the plurality of the users, and numbers corresponding to the names of the users in the extension number database, and the names of the users can be changed simply by rewriting the extension number database, requiring no large-scale change. Furthermore, a general-purpose communications terminal equipment without any special modification will suffice for the communications terminal equipment at the sending end.

In addition, by providing the communications terminal equipment according to the invention with the names of callers and telephone numbers on the sending side as database, and further, with schedules of a plurality of terminal users as database, it becomes possible to provided a method of calling up the target call receiver, capable of offering a higher degree of service.

TABLE 1

| cataloged extension number | set information | call-up sound |
|---|---|---|
| 0 | default | bell |
| 1 | ○ | recorded sound message (Aikawa) |
| 2 | ○ | recorded sound message (Inoue) |
| 3 | ○ | recorded sound message (Uchimura) |
| 4 | ○ | recordd sound message (Endo) |
| 5– | X | — |

TABLE 2

| designation for operation guides | Operation Guide Message |
|---|---|
| (a) | This is ○○ industries, Section XX of ΔΔ Dep't. Your call is connected to the extension line shared by a plurality of users. By inputting an extension number, you can designate a party whom you wish to call up. If you wish to designate an extension number, press number 1, and otherwise, press number 0, please. |
| (b) | This terminal is for use by (Aikawa: 1), (Inoue: 2), (Uchimura: 3), (Endo: 4). Press the number corresponding to the name of a party to whom your call is to be relayed. |
| (c) | Sorry, but the number you have designated is out of use now. If you wish to redesignate a number, press number 1, please. |
| (d) | ( ) is not at the desk at present. Expected time to return is ( ). |
| (e) | ( ) is out of the office. ( ) is not expected to return today. |
| (f) | ( ) is ( ) at present. Expected time to return is ( ). If it is an urgent matter, someone else will be pleased to answer your call. In that case, press number 1, please. Or if you wish us to take your message, and to convey it later as a voice message, please press number 7, and leave the message. |

TABLE 3

| telephone no. | name of caller |
|---|---|
| 03-1234-5678 | recorded sound message (Ando) |
| 03-1234-5678 | recorded sound message (Iguchi) |
| 03-1234-5678 | recorded sound message (Iguchi) |
| 03-1234-5678 | recorded sound message (A Co., Ltd.) |
| . | . |
| . | . |
| . | . |
| other numbers | recorded sound message (Who?) |

TABLE 4

| cataloged extension no. | set information | reading | accent type |
|---|---|---|---|
| 1 | ○ | Aikawa | 1 |
| 2 | ○ | Inoue | 0 |
| 3 | ○ | Uchimura | 2 |
| 4 | ○ | Endo | 1 |
| 5–~ | X | — | — |

TABLE 5

| unavailable date | desk-leaving time | expected time to return |
|---|---|---|
| Oct. 22 | 9:00 | 15:00 |
| Oct. 24 | 15:00 | no return |
| Oct. 29 | 10:00 | 13:00 |

TABLE 6

| cataloged extension no. | set information | reading | accent type | e-mail address |
|---|---|---|---|---|
| 1 | ○ | Aikawa | 1 | aikawa@aaa.bbb.co.jp |
| 2 | ○ | Inoue | 0 | inoue@aaa.bbb.co.jp |
| 3 | ○ | Uchimura | 2 | uchimura@aaa.bbb.co.jp |
| 4 | ○ | Endo | 1 | endou@aaa.bbb.co.jp |
| 5~ | X | — | — | — |

TABLE 7

| unavailable date | desk-leaving time | location | conversion phrase | expected time to return |
|---|---|---|---|---|
| Oct. 22 | 9:00 | out of office | out on business | 15:00 |
| Oct. 24 | 15:00 | out of office | out on business | not expected to return |
| Oct. 29 | 10:00 | within office | not at the desk | 13:00 |
| Oct. 31 | all day | legal holiday | has taken a day off | — |

FIG. 1: A block diagram of a first embodiment of a communications terminal equipment according to the invention
100: a communications terminal equipment, 110: a memory, 102: a processor, 104: a speech output unit (speaker), 112: an extension number database, 114: an operation guide database,
116: a call-up speech table
FIG. 2 respective components inside the processor
202: a receiver, 204: a transmitter, 206: a database/table access unit,
208: an input numeral value determining unit,
210: a message creation unit,
212: a call-up speech generation unit, 214: a clock
FIG. 4: A block diagram of a second embodiment of a communications terminal equipment according to the invention
118: a telephone directory database
FIG. 6: A block diagram of a fourth embodiment of a communications terminal equipment according to the invention
120: a schedule database

What is claimed is:

1. A communications terminal equipment connected to a single communication circuit for use by a plurality of users, comprising;
a memory incorporating a first database for storing respective names of cataloged users of the communications terminal equipment, and numbers corresponding to the respective names of the cataloged users, as respective cataloged extension numbers;
a processor for transmitting to a caller through the single communication circuit an automatically created input including the names of the cataloged users and their respective cataloged extension numbers stored in the first data base, for identifying the name of a target call receiver among the names of the cataloged users by comparing a designated cataloged extension number received from the caller to the cataloged extension numbers in the first database, and for generating a call-up speech for calling up the target call receiver; and a speech output unit for outputting the call-up speech.

2. A communications terminal equipment according to claim 1, wherein the memory incorporates a call-up speech table for use in generating the call-up speech.

3. A communications terminal equipment according to claim 1, wherein the memory incorporates a second database storing operation guides for transmitting the input directive to the caller.

4. A communications terminal equipment according to claim 1, wherein the memory additionally incorporates a third database cataloging names of one or more callers and telephone numbers corresponding to the callers, respectively.

5. A communications terminal equipment according to claim 1, wherein the respective names of the cataloged users are cataloged as respective speech data in the first database.

6. A communications terminal equipment according to claim 1, wherein the respective names of the cataloged users are cataloged as data based on reading and an accent type thereof in the first database.

7. A communications terminal equipment according to claim 1, wherein the memory additionally incorporates a fourth database storing a schedule of times of non-presence for the respective cataloged users, and the processor is a processor for also transmitting information indicating non-presence of the target call receiver in case the target call receiver is determined not to be present by referring to the fourth database.

8. A method of calling up a target call receiver among a plurality of users of a communications terminal equipment connected to a single communication circuit, said method comprising the steps of:

cataloging beforehand respective names of the plurality of users of the communications terminal equipment as respective names of cataloged users, and numbers corresponding to the respective names of the cataloged users as cataloged extension numbers in a first database provided in a memory of the communications terminal equipment;

transmitting to a caller through the single communication circuit an automatically created input directive including the names of the cataloged users and their respective cataloged extension numbers stored in the first data base;

identifying the name of a target call receiver among the names of the cataloged users by comparing a designated cataloged extension number received from the caller to the cataloged extension numbers in the first database;

generating a call-up speech for calling up the target call receiver as identified; and outputting the call-up speech.

* * * * *